United States Patent [19]

Johnson

[11] 4,067,297
[45] Jan. 10, 1978

[54] SWINE FINISHING BARN

[76] Inventor: Terry D. Johnson, 444 N. Lake Drive, Watertown, S. Dak. 57201

[21] Appl. No.: 711,074

[22] Filed: Aug. 2, 1976

[51] Int. Cl.$^2$ ............................................. A01K 1/00
[52] U.S. Cl. .................................. 119/16; 119/28
[58] Field of Search ................ 119/28, 16, 20, 22; 214/17 DA; 198/522

[56] References Cited
U.S. PATENT DOCUMENTS

| | | | |
|---|---|---|---|
| 3,229,665 | 1/1966 | Baltz | 119/52 AF |
| 3,283,744 | 11/1966 | Conover | 119/16 |
| 3,919,976 | 11/1975 | Meyer et al. | 119/28 X |

*Primary Examiner*—Hugh R. Chamblee
*Attorney, Agent, or Firm*—Merchant, Gould, Smith, Edell, Welter & Schmidt

[57] ABSTRACT

In a self cleaning enclosure for production of livestock including hogs an enclosed slightly conical circular surface is disclosed which includes a scraper extending radially outward over the enclosed surface and rotational over the surface to effect cleaning and sanitization of the surface. The scraper includes a conveyor system out of direct contact with the surface which carries the waste material outward along the scraper to a trench encircling the enclosed surface and serving as a depository for the waste. A trench scraper is carried with the surface scraper, and extends into the trench for moving the waste to a localized outlet for removal of the waste from the trench. A motor caused rotation of the scraper around the surface and also causes operation of the conveyor system.

9 Claims, 7 Drawing Figures

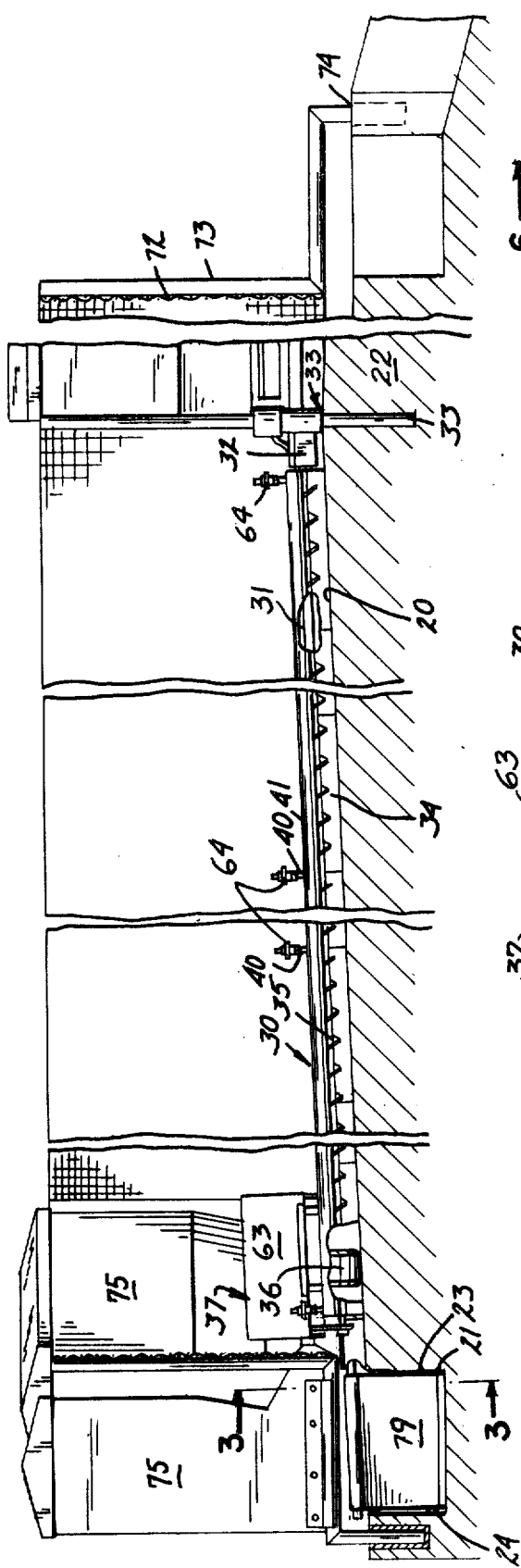
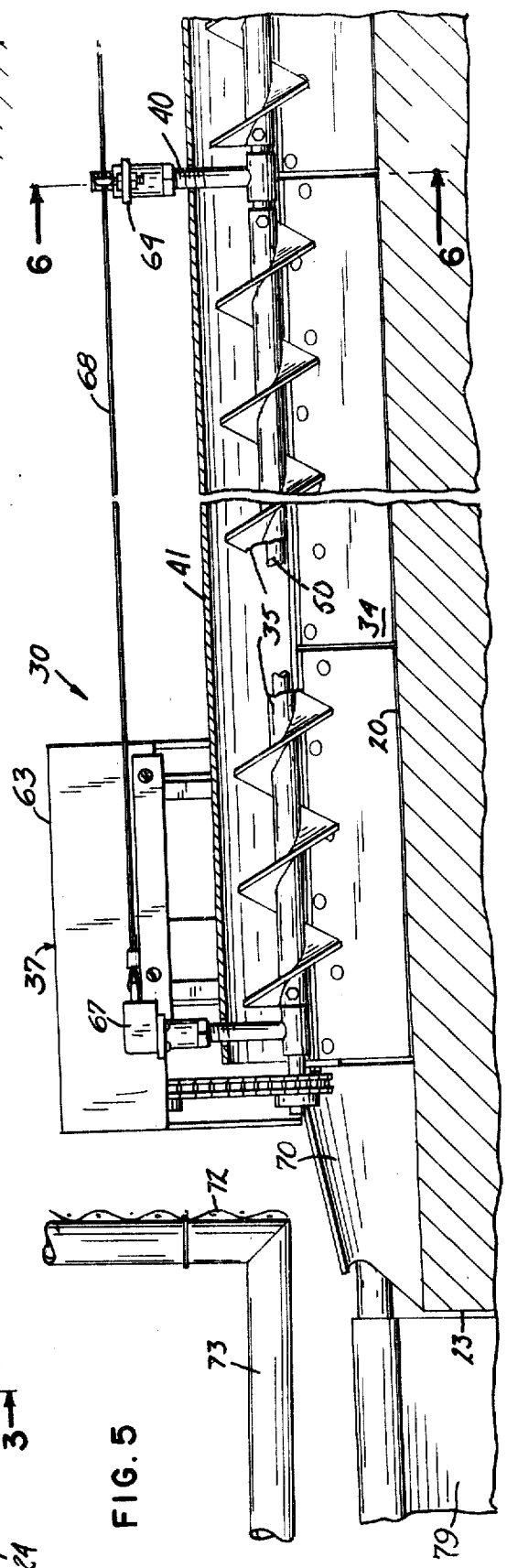
FIG. 2
FIG. 5

SWINE FINISHING BARN

BACKGROUND OF THE INVENTION

This invention relates to the field of animal husbandry, and particularly to swine production on a commercial scale. Experience has taught that in commercial swineries, where large animal populations are confined to small surface areas, proper sanitation is essential, not only for the health of the animals, but for that of the husbandmen as well. It has also become evident that the presence of workmen in an area inhabited by a population of swine is unwelcome both to the animals and to the workmen, and may be hazardous particularly in the presence of mother sows or boars of uncertain temperament.

SUMMARY OF THE INVENTION

The present invention comprises an animal enclosure in which the necessary cleaning function is performed cyclically and automatically, the unwanted materials being delivered not at the center but at the periphery of the enclosure so that human entrance to the area inhabited by animals is required only for such emergencies as the tending of ailing animals. This is accomplished by designing the enclosure to be circular, surrounding it with a trench and restraining fence, and operating a cleaning apparatus pivotally about the center of the enclosure to scrape material from the surface and carry it to the trench, for further transport to a common loading area.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWINGS

In the drawings,

FIG. 2 is a sectional view along the line 2—2 of FIG. 1;

FIG. 5 is a detailed view of a portion of FIG. 2 to a larger scale;

DESCRIPTION OF THE PREFERRED EMBODIMENTS

Figure 1:
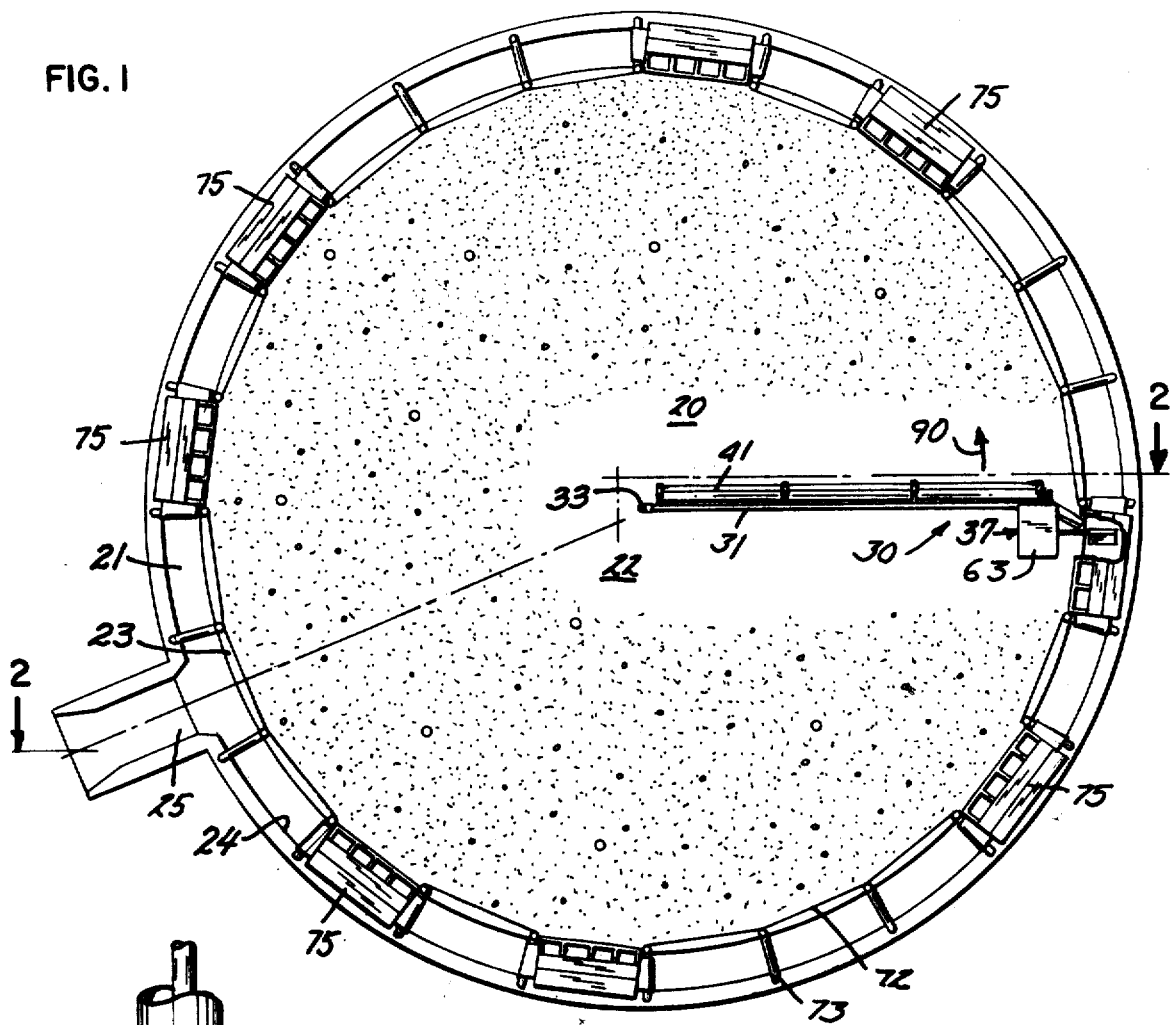
FIG. 1 is a plan view of an animal enclosure according to my invention.
Figure 6:
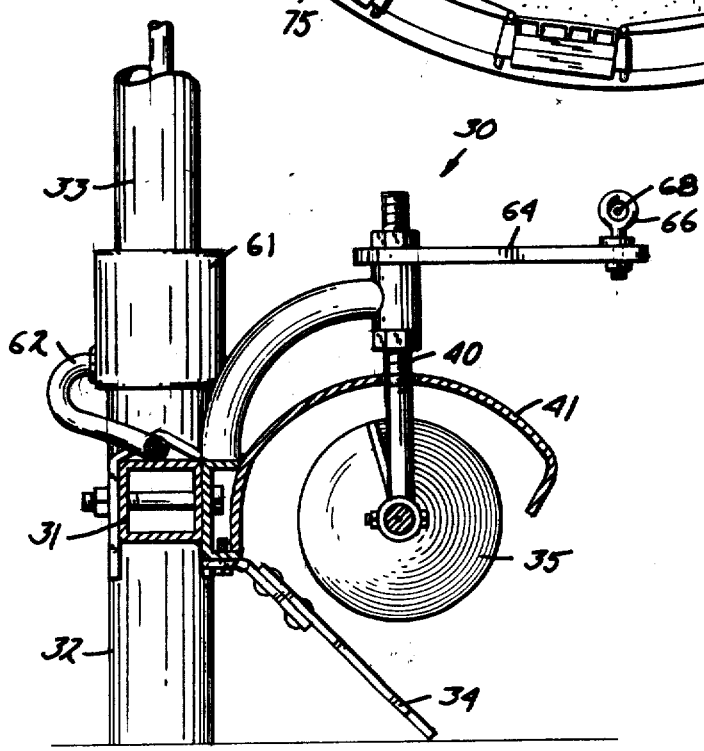
FIG. 6 is a sectional view along the line 6—6 of FIG. 5.

The drawings show thay my animal enclosure comprises a substantially circular animal supporting surface 20 surrounded by a trench 21. Surface 20 is preferably conical and upwardly convex, its center 22 being at a higher level than its circumference. Trench 21 has an inner wall 23 and an outer wall 24: it is of variable depth, being deepest where it connects with an outlet channel 25, and decreasing in depth in both directions circumferentially therefrom. Trench 21 may also be deeper outwardly than inwardly if desired. For most satisfactory operation, surface 20 is of concrete or some other rigid permanent material.

Cleaning apparatus generally indicated by reference numeral 30 coacts with surface 20 to remove the droppings of the animals and keep the surface clean. Apparatus 30 includes an arm 31 which extends generally radially from center 22, where it is pivotally connected by a fitting 32 with a hollow pivot post 33. A scraper 34 and a conveyor 35 are carried by arm 31, the former contacting surface 20 as the apparatus is carried around pivot 33 by a drive wheel 36 which is a part of a power unit 37 at the outer end of arm 31. Conveyor 35 is shown as an auger mounted in brackets 40 on arm 31, and is driven by power unit 37: it is partly enclosed between scraper 34 and a return member or partial cover 41, to most effectively transport material outwardly. It is apparent that auger 35 could be replaced by a chain type conveyor, a high pressure spray, or any other suitable means of conveying the waste material along arm 31 to the trench 21.

Figure 3:
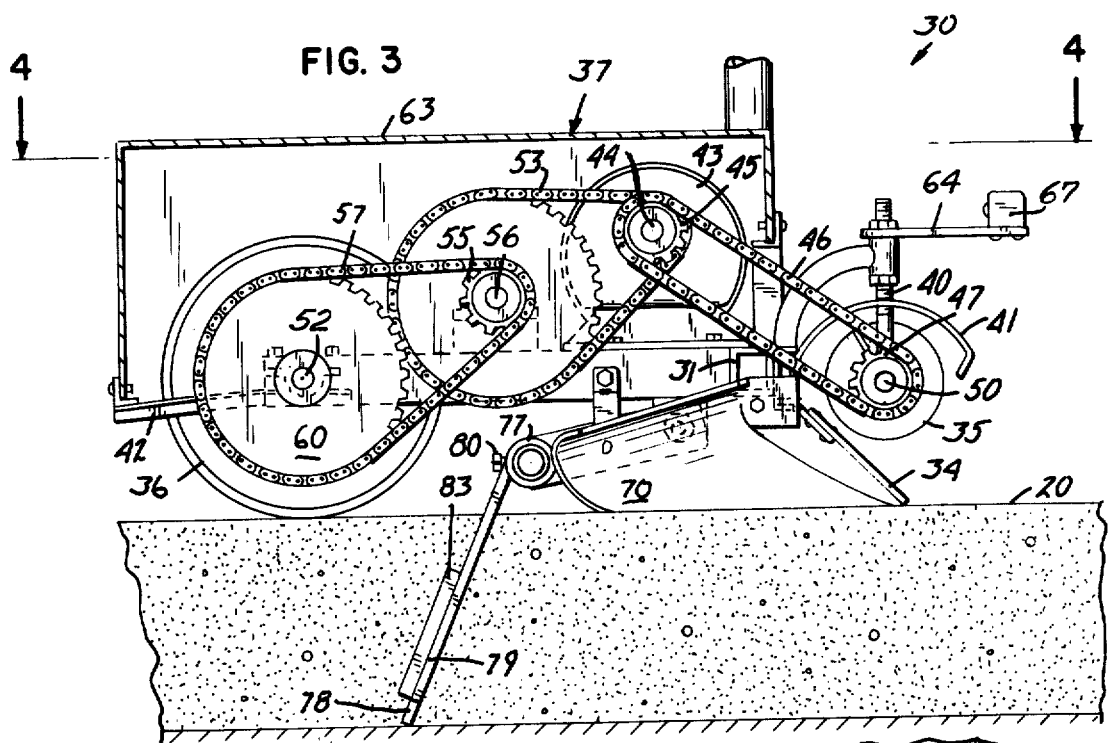
FIG. 3 is a sectional view along the line 3—3 of FIG. 2.
Figure 4:
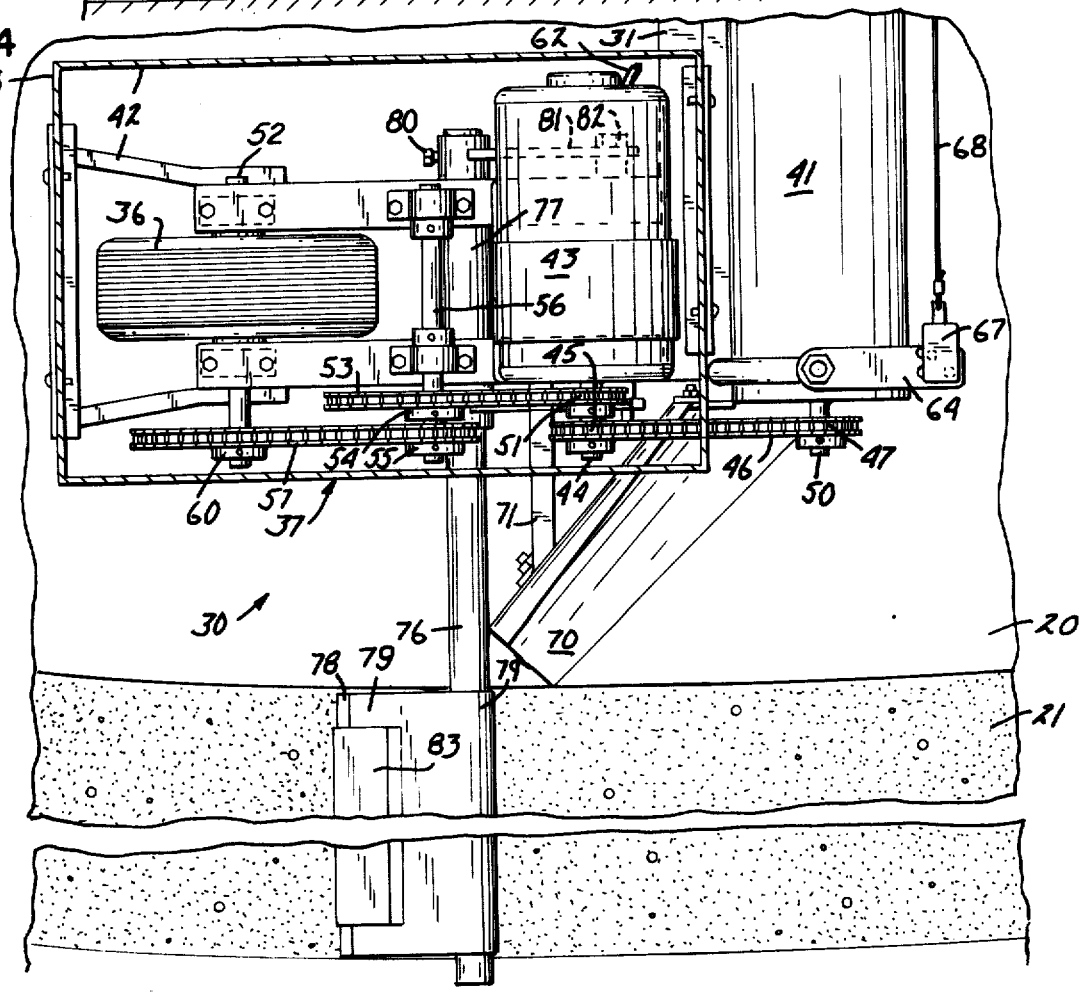
FIG. 4 is a sectional view along the line 4—4 of FIG. 3.

Power unit 37 is shown in FIGS. 3 and 4 to comprise a frame 42 secured to arm 31 and carrying an electric motor 43 which includes suitable reducing gearing, so that its output shaft 44 operates relatively slowly. Shaft 44 is coupled by a sprocket wheel 45 and chain 46 with a sprocket wheel 47 on the shaft 50 of auger 35. A second sprocket wheel 51 on motor shaft 44 is coupled to the shaft 52 of wheel 36 by a chain 53, sprocket wheels 54 and 55 on a jackshaft 56, a chain 57, and a futher sprocket wheel 60. Electrical energy from motor 43 may conveniently be supplied from a suitable remotely controlled source through post 33 and suitable transfer or slip ring means 61 carried thereby, the energy then being carried along arm 31 to power unit 37 by a cable 62. Power unit 37 is protected by a strong cover 63.

In one installation, motor 43 ran at 89 rpm, as did auger 35. The reduction mechanism was selected to drive wheel 36 at such a speed that apparatus 30 made one revolution of surface 20 in 15 minutes.

A plurality of extension arms 64 are carried by brackets 40 and in turn carry wire guides 66: a wire 68 is fastened to the innermost arm 64, and is connected mechanically to a switch 67 carried on the outermost arm 66. Thus, if an animal is ill or stubborn, and refuses to move as the cleaning apparatus approaches it, the contact of its body with the wire disables the apparatus and prevents damage to the equipment or injury to the animal.

Scraper 34 and auger 35 terminate short of the inside wall of trench 21. An auxiliary scraper 70 is carried by arm 31 at its outer end, and may be braced at 71 to frame 42. Its purpose is to transport into trench 21 material distributed by scraper 34 and conveyor 35.

Means such as a fence 72 is provided for preventing the animals from leaving the surface 20. Fence 72 is carried on a plurality of offset poles 73 set in the outer trench wall as at 74 and projecting over the trench at such a height above the inner wall that animals cannot escape below the fence, but auxiliary scraper 70 may pass under the fence to discharge material into the trench. At convenient locations around the enclosure, fence 72 may be replaced by feeding bunkers 75, which must also be offset mounted to permit passage of member 70. A swing gate may be provided at any suitable location in fence 72.

Means are also provided for moving material along trench 21 toward outlet channel 25. A transport blade 79 is carried by power unit 37 on a shaft 76 to depend into trench 21, being shaped if necessary in conformation thereto. Shaft 76 may be pivotally received in a tube 77 or it may be fixed therein as by a set screw 80: tube 77 may be carried in arms 81 for movement with respect to frame 42 at pivots 82. Blade 79 may be intrinsically heavy or may carry an additional weight 83, or spring means may be arranged to act between shaft 76 and tube 77 or between arms 81 and frame 42, the purpose being to insure that blade 79 will, in general, convey material in trench 21 toward channel 25, and yet may yield to the presence of relatively immovable foreign objects in the trench, as may inadvertently occur. If desired, blade 79 may be edged with material such as nylon, as suggested at 78 in FIG. 3.

The utility of my invention will now be evident. A population of animals is installed in the circular space, over which they are free to roam, obtaining feed from bunkers 75. When droppings collect on surface 20, motor 43 is energized and cleaning apparatus 30 begins to move around the enclosure in the direction of arrow 90, scraper 34 gathering unwanted material and auger 35 transporting it outward for delivery by auxiliary scrapers 70 to the trench. Movement of the arm is quite slow, and animals on the surface move ahead of it very readily, while being retained within the enclosure by a fence 72 and bunkers 75. If an animal is stubborn, sick, or defunct, contact of its body with trip wire 68 de-energizes motor 43.

Additionally, trip wire 68 could be electrified to serve as a prod for urging the animals along in front of the moving arm 31. Alternatively, a second flexible wire (not shown) could be installed immediately in front of wire 65 which would serve as an electrical prod. In this case, the second wire would have to be sufficiently flexible to permit the tripping of the wire 65 to de-energize motor 43 if the obstruction was truly immobile.

It will be appreciated that apparatus 30 may remain in continuous operation at its very low speed. However, it is apparent that one or more rotations of the apparatus at predetermined periodic intervals is also sufficient to clean surface 20. The frequency of repetition of the cleaning cycle depends of course on the size of the inhabiting population.

The same rotation of apparatus 30 which cleans surface 20 also acts to sweep out the trench material deposited therein, for removal at 25 by manual or mechanical loading into disposal vehicles. It will be evident that surface 20 may be maintained in a satisfactory clean condition for long periods of time without requiring personal entry of the husbandmen or his employees into the enclosure unless trip wire 65 is actuated.

Operation of my invention may be enhanced if water is trickled to surface 20 from a row of nozzles extending the length of arm 31, and water for this purpose may be supplied through a swivel connection at central post 33, just as is the electricity for motor 43. Additionally, disinfectant may be mixed with the water or substituted to sanitize the surface 20.

Figure 7:
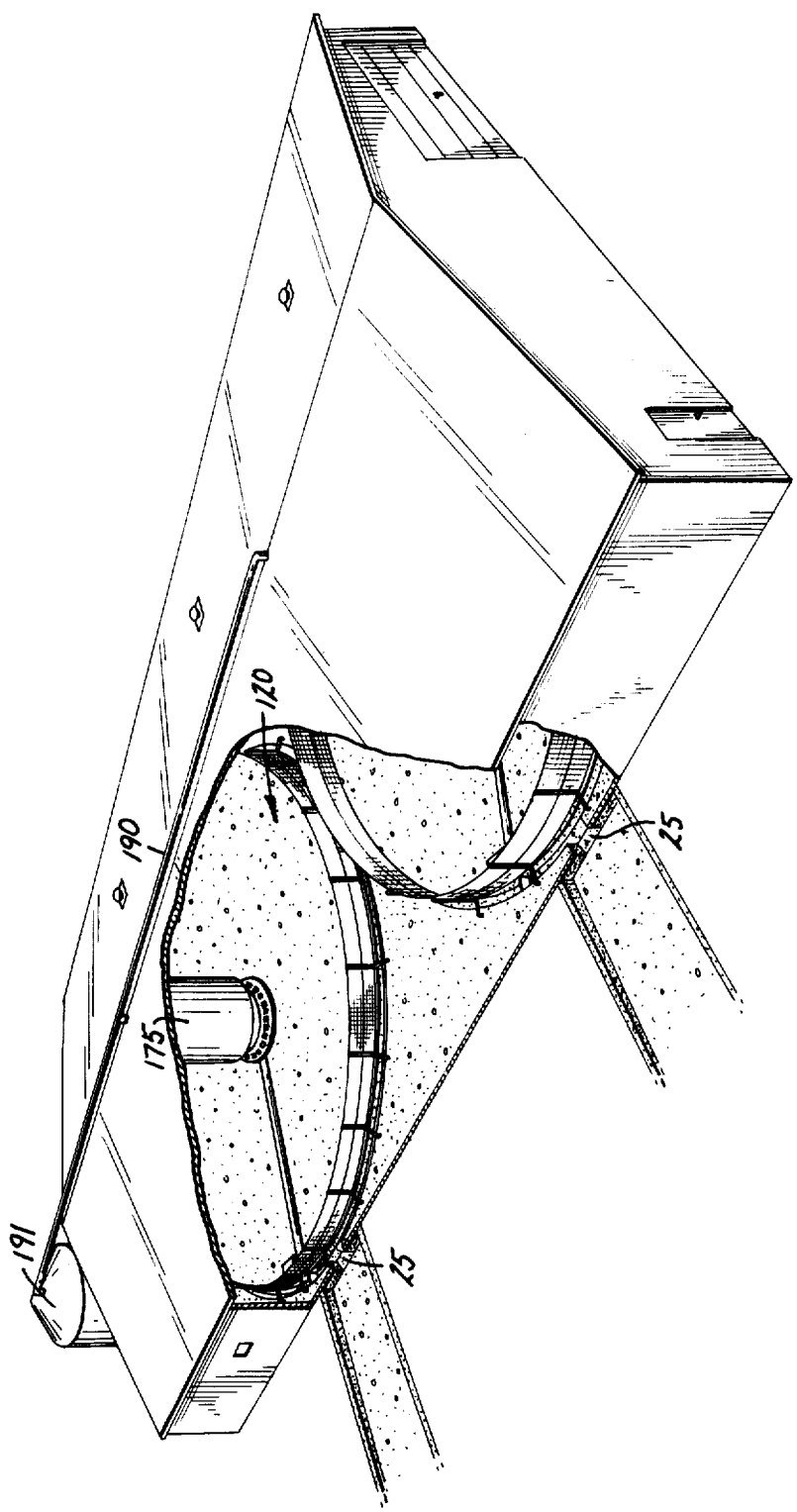
FIG. 7 is a perspective view of a modification of the invention, parts being broken away for clarity of illustration.

FIG. 7 shows a slight modification of my system. It differs only in the omission of feed bunkers 75 of the first embodiment. Feeding is accomplished near the center of an area 120 rather than at peripheral bunkers, the central feeder 175 being filled by suitable overhead ducting 190 from a central source 191. The figure also shows that my invention applies equally well when one or more of the animal enclosures are installed in buildings for protection of the animals from inclement weather.

From the foregoing, it will be clear that I have invented a new and useful animal enclosure which automatically clears itself of droppings without the intervention of human workmen, so that the health and welfare both of the animals and of the husbandmen is optimized.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. An animal enclosure comprising, in combination:
a substantially circular animal supporting surface;
a trench surrounding said surface;
cleaning apparatus for said surface mounted for pivotal movement around the center thereof, including
  a. a radially extending scraper for engaging said surface to release and gather waste material deposited thereon,
  b. radially extending conveyor means mounted in alignment with said surface and said scraper and operable to convey only outwardly, toward said trench, material gathered by said scraper, and
  c. motor means for causing pivotal movement of said apparatus and operation of said conveyor;
and means retaining animals on said surface within said trench while enabling radial discharge of waste material into said trench.

2. The structure of claim 1 in which said conveyor is an auger.

3. The structure of claim 1 in which the retaining means includes spaced feeding bunkers.

4. The structure of claim 1 in which the retaining means is supported solely from outside the trench.

5. The structure of claim 1 including animal feeding means circularly located near the center of said surface.

6. An animal enclosure comprising, in combination:
a substantially circular animal supporting surface;
a trench surrounding said surface;
means retaining animals on said surface within said trench;
and cleaning apparatus for said surface mounted for pivotal movement around the center thereof, including:
  a. a radially extending scraper for engaging said surface to gather waste material deposited thereon,
  b. radially extending conveyor means mounted in alignment with said surface and said scraper and operable to convey material gathered by said scraper outward toward said trench, and
  c. motor means for causing pivotal movement of said apparatus and operation of said conveyor, said cleaning apparatus including radially extending means movable with said scraper and said conveyor and operable upon contact with a motionless body on said surface to disable said motor means.

7. An animal enclosure comprising, in combination:
a substantially circular animal supporting surface;
a trench surrounding said surface;
means retaining animals on said surface within said trench;
and cleaning apparatus for said surface mounted for pivotal movement around the center thereof, including;
  a. a radially extending scraper for engaging said surface to gather waste material deposited thereon,
  b. radially extending conveyor means mounted in alignment with said surface and said scraper and operable to convey material gathered by said scraper outward toward said trench, and
  c. motor means for causing pivotal movement of said apparatus and operation of said conveyor, said cleaning apparatus including a further cleaning blade carried by said apparatus and projecting downward into said trench for displacing therealong material deposited therein.

8. The structure of claim 7 in which said trench is of variable depth and said further cleaning blade is vertically adjustable.

9. An animal enclosure comprising, in combination:
a substantially circular animal supporting surface;
a trench surrounding said surface;
means retaining animals on said surface within said trench;
and cleaning apparatus for said surface mounted for pivotal movement around the center thereof, including:
  a. a radially extending scraper for engaging said surface to gather waste material deposited thereon,
  b. radially extending conveyor means mounted in alignment with said surface and said scraper and operable to convey material gathered by said scraper outward toward said trench, and
  c. motor means for causing pivotal movement of said apparatus and operation of said conveyor, the scraper and conveyor terminating radially inwardly of the retaining means;
and further means extending under the retaining means for transporting material delivered by said conveyor to said trench.

* * * * *